Figure 1:
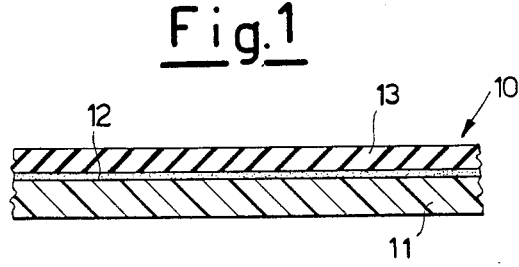

United States Patent [19]

Clerici

[11] Patent Number: 4,985,299
[45] Date of Patent: Jan. 15, 1991

[54] STRATIFORM PRODUCT IN SHEET FORM FOR PACKAGING PURPOSES

[76] Inventor: Piero R. Clerici, Piazza S. Ambrogio, 12, Milan, Italy

[21] Appl. No.: 495,170

[22] Filed: Mar. 16, 1990

[30] Foreign Application Priority Data

Mar. 20, 1989 [IT]  Italy ................................ 19828 A/89

[51] Int. Cl.$^5$ .............................................. B32B 27/08
[52] U.S. Cl. .............................. 428/314.4; 428/317.1; 428/317.7; 428/319.3
[58] Field of Search ............... 428/314.4, 314.8, 317.1, 428/317.7, 319.3, 343

[56] References Cited

U.S. PATENT DOCUMENTS 4,576,854  3/1986  Kurahashi ........................... 428/343
4,791,024  12/1988  Clerici ................................ 428/343

Primary Examiner—William J. Van Balen
Attorney, Agent, or Firm—Charles E. Brown; Charles A. Brown

[57] ABSTRACT

The stratiform product in sheet form for packaging purposes comprises at least one impact-resistant film, made e.g., from a closed-cell foamed polyethylene, and a layer constituted by an elastomeric mass endowed with properties of selective and repetitive adhesion. Between this impact-resistant film and the layer of elastomeric mass, a support for this latter layer can be provided, which is constituted, e.g., by a non-woven fabric or by a plastic film. The product for packaging purposes protects the packaged articles against the impacts and the environmental agents, keeps said packaged articles fixed in a predetermined relative position and makes it possible inspections and/or checks to be carried out, with the initial integrity of the package being subsequently restored.

11 Claims, 1 Drawing Sheet

STRATIFORM PRODUCT IN SHEET FORM FOR PACKAGING PURPOSES

The present invention relates to a stratiform product in sheet form for packaging purposes.

Products in sheet form for packaging purposes are known in the most different shapes and made from different materials, such as paper, films or sheets of closed-cell foamed polyethylene, films of transparent plastic materials applied onto cardboard supports in order to produce the so-said "blister" packages, and so on.

Each one of said packaging products displays spcific characteristics and properties, which determine each time their use.

The purpose of the instant invention is on the contrary of providing a product in sheet form for packaging purposes which combines with one another all of the following characteristics and properties:

(a) of supplying adequate impact protection to the packaged products;
(b) of protecting the packaged products against the environmental agents, in particular against the atmospheric agents;
(c) of blocking the packaged article, or a plurality of articles packaged all together, in a predetermined mutual position, and of preserving this mutual positioning also in case the package undergoes casual impacts;
(d) finally, of making it possible the packaged article(s) to be accessed for inspections and/or checks, with the possibility of the initial integrity of the package to be restored.

In order to achieve this purpose, according to the present invention a stratiform product in sheet form for packaging purposes is proposed, which is substantially characterized in that it comprises at least one impact-resistant film and a layer constituted by an elastomeric mass endowed with properties of selective and repetitive adhesion, with said film and said layer being united to each other by means of an inseparable bond.

Impact-resistant films are per-se known and used for packaging purposes. Such films can be constituted, e.g., by closed-cell foamed polyethylene, by polyurethanic foams, by bubble polyethylene, and the like and, according to their use, such films can have various values of thickness.

Also the elastomeric masses endowed with properties of selective and repetitive adhesion are per se known. In fact, that natural property is known of such elastomeric products, as natural rubber and/or synthetic rubber, which consists in that they adhere to themselves only, with a feature which could be called as "selective and repetitive adhesion": "selective", in that these products do not adhere to other surfaces but themselves or analogous products, and "repetitive", in that their adhesiveness is not lost after repeated operations of detachment and re-attachment (i.e., of opening and closure).

Said natural property of these elastomeric products has already been exploited in the past for other purposes, in particular in jointing systems, as it results, e.g., from Italian patent 1 149 738, from U.S. Pat. Nos. 4,576,854 and 4,791,024 and from U.K. patents 20 69 871 and 21 16 253.

According to the present invention, it was surprisingly found that when such an impact-resistant film and a layer of such an elastomeric mass are united with each other, a stratiform product in sheet form for packaging purposes can be obtained, which combines in itself the several requisites and the various features as hereinabove set forth.

In fact:

the impact protection of the articles packaged with this sheet product is supplied by the impact-resistant film of closed-cell foamed polyethylene and the like;

the protection against the environmental agents is supplied by the capability shown by the layer of elastomeric type of adhering, with tight sealing, to itself, and not to the packaged articles; such a feature results furthermore in the contact of the layer of elastomeric type with surfaces of a different nature, specifically with the surfaces of the packaged articles, not generating any transfers or depositions of the elastomeric mass onto the same articles, both over time and following changes in environmental conditions and, more particularly, changes in humidity, temperature, pressure, and so on; as well as, viceversa, the external decorations of the packaged articles not adhering to the surface of the packaging product in sheet form;

the adhesion of the elastomeric mass to itself generates such an adhesion force as to secure that the packaged article, or the articles packaged all together remain(s) in its(their) position(s) as established at packaging time, even if said packages are stressed by fortuitous impacts, thus endowing the package with a characteristic analogous to the feature of the so-said "blister" packages;

inasmuch as the property of the elastomeric materials is of repeatedly adhering to themselves without losing their adhesiveness, the packaged article(s) can be accessed, by opening the package, in order to perform inspection and/or check operations (quality control, customs inspections, and so forth) and the initial integrity of the package can be subsequently restored.

According to the present invention, the elastomeric layer can be directly applied onto the impact-resistant film, by adopting per se known technologies, such as, e.g., spreading, calendering, and the like.

According to a variant of the present invention, a product in sheet form for packaging purposes can be provided as well, which is obtained by first applying, by means of these technologies known from the prior art, the elastomeric layer onto a flat support of the type of nonwoven fabric, knitted fabric, plastic film (e.g., polyethylene and/or polypropylene films), and the like, and then coupling such an intermediate product with the impact-resistant film: in such case, between the impact-resistant film and the elastomeric layer a further layer of non-woven fabric, plastic film, or the like, is additionally provided.

Figure 2:
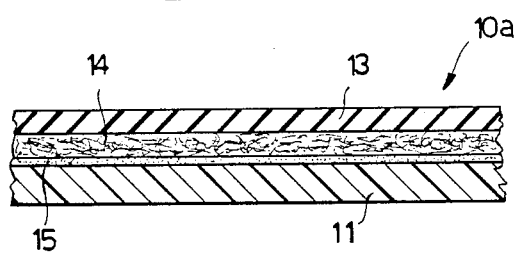
Figure 3:
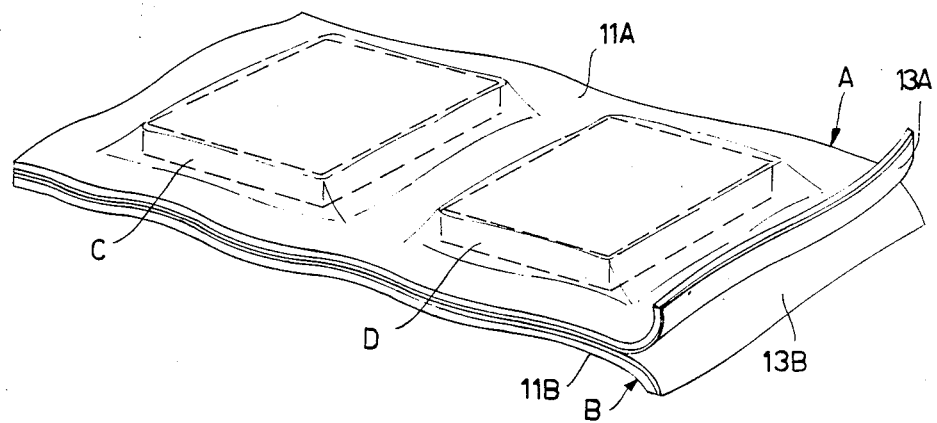

The invention is disclosed hereinunder in greater detail on the basis of two examples of practical embodiment thereof and of the figures of the hereto attached drawing, in which:

FIG. 1 shows a schematic, sectional view on an enlarged scale of the stratiform product in sheet form for packaging purposes, FIG. 2 shows, in the same way as of FIG. 1, a different form of practical embodiment of the packaging product; and FIG. 3 shows a perspective view of articles packaged between two sheets of packaging material according to the present invention, of the same type as shown in FIG. 1.

By referring first to FIG. 1, in it a stratiform product in sheet form for packaging purposes is shown, which is generally indicated by the reference numeral 10, and is constituted by an impact-resistant film 11, on one face of which an adhesion-promoter layer 12 is applied, and by an elastomeric layer 13 superimposed to said layer 12.

In particular, this product in sheet form for packaging purposes was obtained as follows.

A closed-cell polyethylene film (of the type of BREMBOCELL, trade mark by Bayer AG) was submitted to a preliminary treatment, on one of its faces, according to the well-known technique of corona-discharge or plasma treatment, in order to improve the characteristics of adhesiveness of said surface.

Onto the so-pre-treated face of this film, an adhesion promoter layer was then applied in an adequate amount, in particular in an amount of approximately 20 g/m$^2$. As the adhesion promoter, one of the following products available from the market can be used: MOWILITH DM 772 or ADDITOL VXL 4950 by Hoechst AG, LUNATACK D 5438c OR LUNATACK HM 6515c by H. B. Fuller G.m.b.H.

Above the adhesion-promoter layer applied onto the closed-cell polyethylene film a layer made from a mixture of elastomers of the types of natural rubber and synthetic rubber was then applied by means of techniques known from the prior art, e.g., by spreading. Such a mixture of elastomers was constituted, e.g., by 50% by weight of natural rubber and 50% by weight of synthetic rubber, e.g., a thermoplastic rubber, or by up to 60% by weight of natural rubber and 40% by weight of synthetic rubber, dissolved at 30% of solid matter in a blend of suitable solvents, such as aromatic and/or naphthenic solvents, constituted, e.g., by 35% of toluene and 65% of cyclohexane.

The so prepared product was then caused to run through an evaporation oven in order to dry the elastomeric mass in solution spread above the adhesion-promoter layer applied above the closed-cell polyethylene film, and finally a stratiform product in sheet form for packaging purposes was obtained, which was constituted by a closed-cell polyethylene film provided on one of its faces with a layer with characteristics of selective and repetitive adhesion.

A variant of the packaging product according to the present invention is shown in FIG. 2, wherein the sheet, generally indicated with the reference numeral 10a, is constituted by an impact-resistant film 11 bearing on one of its faces a layer of hot-melt adhesive 15 and by a layer of non-woven fabric 14 bearing an elastomeric layer 13, with said film 11 with the hot-melt adhesive layer 15 and said layer of non-woven fabric 14 with the elastomeric layer 13 being suitably coupled with each other in order to produce the packaging product in sheet form.

In particular, this product was obtained as follows.

In this case, the two intermediate components of the product have been separately prepared.

On the one hand, on one face of a non-woven fabric of a normally treaded type, e.g., the non-woven fabric manufactured by Nordlys and traded under the mark VIGNEC 105, a mixture of elastomers in solution, of the same type as disclosed with reference to FIG. 1, was applied by spreading, and the applied layer was dried in an evaporation oven.

On the other hand, on one face of a closed-cell polyethylene film (BREMBOCELL type by Bayer AG), a layer of ethylene-acrylic acid copolymer, constituting a hot-melt adhesive, was applied by spreading in an amount of 10–15 g/m$^2$.

Both of said so separately prepared components, available as rolls, were then charged to a machine for calender-coupling, with the face of the closed-cell polyethylene film bearing the hot-melt adhesive layer and the face of the non-woven fabric opposite to the face onto which the layer of elastomeric mixture had been spread being brought into mutual contact.

In such a coupling machine, an I.R. region was provided, through which the only closed-cell polyethylene film bearing the hot-melt adhesive layer was caused to run, in order to pre-heat said hot-melt adhesive layer until it was softened. The uncoated face of the non-woven fabric was then brought into contact with the layer of softened hot-melt adhesive borne by the closed-cell polyethylene film, and the two, so-coupled, intermediate components were caused to run through the two rolls of the calender, which rolls were kept under suitable conditions of temperature and pressure. This step is usually defined as "continuous coupling with calendering".

In that way, a stratiform product in sheet form for packaging purposes was obtained, which showed the desired characteristics and properties.

In FIG. 3 a package containing two things is schematically shown, which is obtained by using two packaging sheets of the same type as shown in FIG. 1.

The package shown is similar to the so-said "blister" type of package, with a first sheet A and a second sheet B enclosing between each other two objects C and D. Each of said sheets A and B is constituted by an impact-resistant film 11A and respectively 11B, on a face of which the elastomeric layer 13A and 13B is respectively spread. The two sheets A and B are applied to the things C and D to be packaged in such a way as to face each other with their faces bearing the layers 13A and 13B, which layers, in the regions which surround the things C and D are brought into mutual contact in order to adhere to each other, and therefore enclose the packaged things under tight sealing conditions, as one can clearly see from FIG. 3. Thanks to the hereinabove disclosed properties of the elastomeric layers 13A and 13B of the packaging sheets A and B, of adhering to themselves only, they will not adhere to the surfaces of the packaged things C and D.

Vice-versa, as shown on the right in FIG. 3, the two packaging sheets A and B can be detached from each other, in that their elastomeric layers 13A and 13B enable them to get detached from each other, without thereby lose their adhesiveness, therefore making it possible the integrity of the package to be restored.

The articles C and D are protected against the impacts by the impact-resistant films 11A and 11B of the two packaging sheets A and B, and they are protected against the environmental agents and are kept in their position as pre-established at the packaging time, in that they are surrounded by regions in which the layers 13A and 13B of the two sheets of packaging material A and B adhere to each other.

I claim:

1. Stratiform product in sheet form for packaging purposes characterized in that it comprises at least one impact-resistant film and a layer constituted by an elastomeric mass endowed with properties of selective and repetitive adhesion, with said film and said layer being united to each other by means of an inseparable bond.

2. Packaging product according to claim 1, characterized in that the union between said impact-resistant film and said elastomeric layer is obtained by means an intermediate, adhesion-promoter layer.

3. Packaging product according to claim 1, characterized in that the impact-resistant film is made from closed-cell foamed polyethylene, from polyurethane foam or from bubble-polyethylene.

4. Packaging product according to claim 1, characterized in that the elastomeric layer is made from a mixture of natural rubber and synthetic rubber.

5. Packaging product according to claim 1, characterized in that the elastomeric layer is anchored to a flat support, which, with its face opposite to the face bearing the elastomeric layer, is united by coupling with said impact-resistant film.

6. Packaging product according to claim 5, characterized in that between said flat support and said impact-resistant film a layer of hot-melt adhesive is provided.

7. Packaging product according to claim 5, characterized in that said flat support is a non-woven fabric, a knitted fabric, or a plastic film.

8. Packaging product according to claim 4, characterized in that said mixture is constituted by 50% by weight of natural rubber and 50% by weight of synthetic rubber.

9. Packaging product according to claim 4, characterized in that said mixture is constituted by up to 60% by weight of natural rubber and 40% by weight of synthetic rubber.

10. Packaging product according to claim 4, characterized in that said synthetic rubber is a thermoplastic rubber.

11. Packaging product according to claim 6, characterized in that said hot-melt adhesive is ethyleneacrylic acid copolymer.

* * * * *